US012196093B2

(12) United States Patent
Opalka et al.

(10) Patent No.: US 12,196,093 B2
(45) Date of Patent: Jan. 14, 2025

(54) ALUMINUM-CHROMIUM OXIDE COATING AND METHOD THEREFOR

(71) Applicant: United Technologies Corporation, Farmington, CT (US)

(72) Inventors: Susanne M. Opalka, Glastonbury, CT (US); Georgios S. Zafiris, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 928 days.

(21) Appl. No.: 15/604,950

(22) Filed: May 25, 2017

(65) Prior Publication Data

US 2018/0340445 A1 Nov. 29, 2018

(51) Int. Cl.
*F01D 25/00* (2006.01)
*C23C 18/12* (2006.01)
(Continued)

(52) U.S. Cl.
CPC ........ *F01D 25/005* (2013.01); *C23C 18/1216* (2013.01); *C23C 18/1295* (2013.01); *C23C 24/08* (2013.01); *C23C 26/00* (2013.01); *C23C 28/04* (2013.01); *C23C 28/042* (2013.01); *C23C 28/048* (2013.01); *C23C 28/3215* (2013.01); *C23C 28/345* (2013.01);
(Continued)

(58) Field of Classification Search
CPC ........ F01D 25/005; F01D 5/288; F01D 5/187; C23C 30/00; C23C 28/42; C23C 28/40; C23C 28/36; C23C 28/3455; C23C 28/345; C23C 28/3215; C23C 28/048; C23C 28/042; C23C 28/04; C23C 26/00; C23C 24/08; C23C 18/1295; C23C 18/1216; C25D 13/22; C25D 13/18; F05D 2300/502; F05D 2220/32; F05D 2300/2112; F05D 2300/132; F05D 2230/90
See application file for complete search history.

(56) References Cited

U.S. PATENT DOCUMENTS

| | | | | |
|---|---|---|---|---|
| 3,505,101 A * | 4/1970 | Hayes | ........................ | C23C 4/11 428/329 |
| 6,406,677 B1 | 6/2002 | Carter et al. | | |

(Continued)

FOREIGN PATENT DOCUMENTS

| | | |
|---|---|---|
| CA | 2601722 | 9/2006 |
| EP | 0937787 | 8/1999 |

(Continued)

OTHER PUBLICATIONS

J. Am. Ceram. Soc., 83[8] 2036-40 (2000): Reaction Mechanism in Alumina/Chromia (Al2O3—Cr2O3) SolidSolutions Obtained by Coprecipitation; Federica Bondioli, Anna Maria Ferrari, Cristina Leonelli,* and Tiziano Manfredini* from IDS dated May 25, 2017 (Year: 2000)from IDS dated May 25, 2017.*

(Continued)

*Primary Examiner* — Humera N. Sheikh
*Assistant Examiner* — Elizabeth D Ivey
(74) *Attorney, Agent, or Firm* — Carlson, Gaskey & Olds, P.C.

(57) ABSTRACT

A gas turbine engine component includes a metal substrate and a coating system disposed on the metal substrate. The coating system includes at least one layer of aluminum-chromium oxide.

11 Claims, 2 Drawing Sheets

(51) Int. Cl.

| | |
|---|---|
| ***C23C 24/08*** | (2006.01) |
| ***C23C 26/00*** | (2006.01) |
| ***C23C 28/00*** | (2006.01) |
| ***C23C 28/04*** | (2006.01) |
| ***C23C 30/00*** | (2006.01) |
| ***C25D 13/22*** | (2006.01) |
| ***F01D 5/18*** | (2006.01) |
| ***F01D 5/28*** | (2006.01) |
| *C25D 13/18* | (2006.01) |

(52) U.S. Cl.

CPC .......... *C23C 28/3455* (2013.01); *C23C 28/36* (2013.01); *C23C 28/40* (2013.01); *C23C 28/42* (2013.01); *C23C 30/00* (2013.01); *C25D 13/22* (2013.01); *F01D 5/187* (2013.01); *F01D 5/288* (2013.01); *C25D 13/18* (2013.01); *F05D 2220/32* (2013.01); *F05D 2230/90* (2013.01); *F05D 2300/132* (2013.01); *F05D 2300/2112* (2013.01); *F05D 2300/502* (2013.01)

(56) References Cited

U.S. PATENT DOCUMENTS

| | | | | |
|---|---|---|---|---|
| 6,616,978 | B1 | 9/2003 | Weimer et al. | |
| 9,340,678 | B2 | 5/2016 | Keszler et al. | |
| 2006/0083937 | A1* | 4/2006 | Burd | F01D 5/288 428/457 |
| 2007/0172676 | A1* | 7/2007 | Burns | C23C 14/08 428/472 |
| 2013/0095340 | A1* | 4/2013 | Sivakumar | C23C 4/02 428/548 |
| 2013/0209834 | A1* | 8/2013 | Engelhart | C23C 14/08 428/684 |

FOREIGN PATENT DOCUMENTS

| | | | | |
|---|---|---|---|---|
| EP | 1647611 | | 4/2006 | |
| JP | 2013052478 A | * | 3/2013 | |
| WO | 2009065179 | | 5/2009 | |
| WO | 2011159675 | | 12/2011 | |
| WO | 2014111264 | | 7/2014 | |
| WO | WO-2014111264 A1 | * | 7/2014 | C23C 14/08 |

OTHER PUBLICATIONS

Bib Data and Translation—JP-2013052478-A; Nose, Masateru; Mar. 2013 (Year: 2013).*

S.C. Tjong*, Haydn Chen; Nanocrystalline materials and coatings; Materials Science and Engineering R 45 (2004) 1-88; Available online at www.sciencedirect.com Aug. 10, 2004 (Year: 2004).*

Merriam Webster : https://www.merriam-webster.com/dictionary/lamellar; definition of "Lamellar" 2020 (Year: 2020).*

Adraider, Y., Pang, Y.X., Nabhani, F., Hodgson, S.N., Sharp, M.C., Al-Waidh, A. (2012). Deposition of alumina coatings on stainless steel by a combined laser/sol-gel technique. Materials Letters 91 (2013) 88-91.

Bondioli, F., Ferrari, A.M., Leonelli, C., and Manfredini, T. (2000). Reaction mechanism in alumina/chromia (Al2O3—Cr2O3) solid solutions obtained by coprecipitation. J. Am. Ceram. Soc., 83(8). pp. 2036-2040.

Braue, W., Mechnich, P., Fritscher, K., Niewolak, L. (2007). Compatibility of mixed zone constituents (YAG, YAP, YCr03) with a chromia-enriched TGO phase during the late stage of TBC lifetime. Surface & Coatings Technology 202. 2007. pp. 670-675.

Eshel, M., and Bino, A. (2002). Polynuclear chromium(III) carboxylates. 3. Cyclic and cubane type hexachromium acetates. Inorganica Chimica Acta 329. 2002. pp. 45-50.

Fujita, M., Inukai, K., Sakida, S., Nanba, T., Ommyoji, J., Yamaguchi, A., and Miura, Y. (2007). Sintering of Al2O3—Cr2O3 powder prepared by Sol-Gel process. Journal of the Society of Materials Science, Japan. vol. 56(6). Jun. 2007. pp. 526-530.

Kim, S.S., and Sanders, Jr., T.H. (2001). Thermodynamic modeling of the isomorphous phase diagrams in the Al2O3—Cr2O3 and V2O3—Cr2O3 systems. J. Am. Ceram. Soc., 84(8). pp. 1881-1884.

Sadeghi, O., Zakharov, L.N., and Nyman, M. (2015). Aqueous formation and manipulation of the iron-oxo Keggin ion. Science Magazine. vol. 347(6228). pp. 1359-1362.

Torapava, N., Radkevich, A., Davydov, D., Titov, A., and Persson, I. (2009). Inorg. Chem. vol. 48. pp. 10383-10388.

European Search Report for European Patent Application No. 18174249 completed Sep. 13, 2018.

* cited by examiner

ALUMINUM-CHROMIUM OXIDE COATING AND METHOD THEREFOR

BACKGROUND

Articles that are subject to corrosion, such as gas turbine engine components, may include a coating to protect an underlying material from corrosion. Some articles have internal passages which are subject to corrosion and can be protected by such a coating.

Various techniques can be used to deposit a coating, such as "chromizing" or "aluminizing," which result in, respectively, a chromium-rich or aluminum-rich coating. Chromizing or aluminizing are commonly applied by vapor deposition and diffusion processes.

SUMMARY

A gas turbine engine component according to an example of the present disclosure includes a metal substrate and a coating system disposed on the metal substrate. The coating system contains at least one layer of aluminum-chromium oxide.

In a further embodiment of any of the foregoing embodiments, the aluminum-chromium oxide includes $Al_2O_3$ and $Cr_2O_3$.

In a further embodiment of any of the foregoing embodiments, aluminum-chromium oxide includes $\alpha Al_2O_3$ and $\alpha$-$Cr_2O_3$.

In a further embodiment of any of the foregoing embodiments, the aluminum-chromium oxide includes $Al_{(2-x)}Cr_xO_3$, wherein x is from 0.6 to 1.4.

In a further embodiment of any of the foregoing embodiments, x is from 1.0 to 1.2.

In a further embodiment of any of the foregoing embodiments, the layer of aluminum-chromium oxide has an average grain size of 100 nanometers or less.

In a further embodiment of any of the foregoing embodiments, the layer of aluminum-chromium oxide has a lamellar structure, and the lamellar structure has a thickness of less than 100 nanometers.

In a further embodiment of any of the foregoing embodiments, the layer of aluminum-chromium oxide is homogeneous.

In a further embodiment of any of the foregoing embodiments, the metal substrate has an internal passage and the layer of aluminum-chromium oxide is disposed on the internal passage.

A further embodiment of any of the foregoing embodiments include a bond coat or a diffusion coating disposed between the layer of aluminum-chromium oxide and the substrate.

A further embodiment of any of the foregoing embodiments include a ceramic thermal barrier topcoat disposed on the layer of aluminum-chromium oxide.

In a further embodiment of any of the foregoing embodiments, the one or more layers of aluminum-chromium oxide contain a dopant metal, and the dopant metal is present in an amount, relative to the total weight of all metals in the one or more layers of aluminum-chromium, of 0.1 wt % to 5 wt %.

A method of forming a coating on a gas turbine engine component according to an example of the present disclosure includes applying one or more films of polynuclear aluminum oxide hydroxide and polynuclear chromium hydroxide to a metal substrate, and thermally treating the metal substrate with the one or more films at a temperature of at least 250° C. The thermal treatment reduces the polynuclear aluminum oxide hydroxides and the polynuclear chromium hydroxides to at least one layer of aluminum-chromium oxide.

In a further embodiment of any of the foregoing embodiments, the polynuclear aluminum oxide hydroxide includes $[AlO_4Al_{12}(OH)_{24}(H_2O)_{12}]^{7+}$ and the polynuclear chromium hydroxide includes one or more of $([Cr_2(OH)_2]^{4+})$, $([Cr_3(OH)_4]^{5+})$, $([Cr_4(OH)_6]^{6+})$, and polynuclear chromium hydroxide carboxylates.

In a further embodiment of any of the foregoing embodiments, the one or more films contain a dopant metal, and the dopant metal is present in the one or more films in an amount, relative to the total weight of all metals in the one or more films, of 0.1 wt % to 5 wt %.

In a further embodiment of any of the foregoing embodiments, the dopant metal is selected from the group consisting of titanium, zirconium, hafnium, tantalum, manganese, tungsten, iron, copper, nickel, and combinations thereof.

In a further embodiment of any of the foregoing embodiments, the dopant metal is selected from the group consisting of cerium, dysprosium, erbium, gadolinium, lanthanum, lutetium, neodymium, praseodymium, scandium, thulium, ytterbium, yttrium, and combinations thereof.

In a further embodiment of any of the foregoing embodiments, the dopant metal includes a first dopant metal selected from the group consisting of titanium, zirconium, hafnium, tantalum, manganese, tungsten, iron, copper, nickel, and combinations thereof and a second dopant metal selected from the group consisting of cerium, dysprosium, erbium, gadolinium, lanthanum, lutetium, neodymium, praseodymium, scandium, thulium, ytterbium, yttrium, and combinations thereof.

In a further embodiment of any of the foregoing embodiments, the at least one layer of aluminum-chromium oxide includes $\alpha$-$Al_2O_3$ and $\alpha$-$Cr_2O_3$.

In a further embodiment of any of the foregoing embodiments, the at least one layer of aluminum-chromium oxide includes $Al_{(2-x)}Cr_xO_3$, wherein x is from 0.6 to 1.4.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
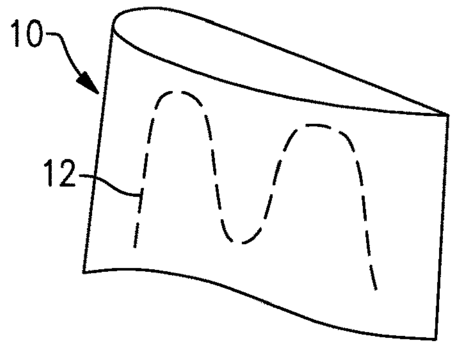
FIG. 1A illustrates a gas turbine engine component.
Figure 1B:
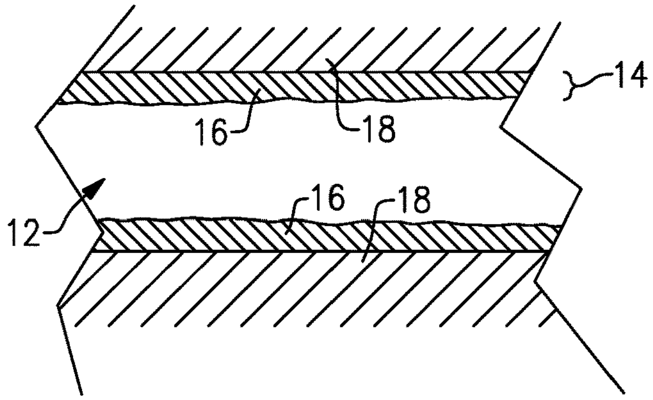
FIG. 1B illustrates a sectioned view of a portion of the gas turbine engine component.

FIG. 1A illustrates a representative portion of an example gas turbine engine component 10 that has an internal passage 12. FIG. 1B illustrates a representative section view of the internal passage 12 of the component 10. In this example, the component 10 is an airfoil for a gas turbine engine, and the internal passage 12 may be used to convey cooling air through the airfoil. The component 10 is formed of a metal. Although not limited, the metal may be a superalloy, such as a cobalt- or nickel-based superalloy. It is to be understood, however, that this disclosure may benefit other gas turbine engine components, such as disk rims, as well as components made of alternate metals or substrates, that may be exposed to corrosive and oxidative environments.

In use the article 10 may be exposed to a range of temperatures and substances from the surrounding environment. The conditions may cause corrosion (chemical attack by substances that deposit on the component, such as molten sulfates that cause hot corrosion at intermediate temperatures) and high temperature oxidation of the metal at elevated temperatures. Both of these phenomena may occur when components are cycled over a wide temperature range during operation. Chromide or aluminide diffusion coatings and overlay bond coats have been used to form oxide scales during thermal cycling to protect against corrosion.

Chromium oxide passivation layers formed from chromide coatings provide good protection against hot corrosion, especially from 600 to 950° C. Chromium oxides do not provide protection against high temperature oxidation, due to the high volatility of chromium, as Cr(VI) species, above 1000° C. Aluminum oxide passivation layers formed from aluminide coatings provide good protection against high temperature oxidation above 1000° C. Since sulfate contaminants are volatilized above 980° C., hot corrosion protection is not a significant issue at higher temperatures, where protection against high temperature oxidation is needed. In this regard, as will be described herein, the component 10 includes a coating system 14 that has one or more layers of aluminum-chromium oxide 16 to facilitate protection against both hot corrosion and high temperature oxidation. Unlike diffusion coatings that rely primarily on diffusion of deposited species into the substrate and chemical interaction of the species with elements of the substrate to form a coating, the one or more layers of aluminum-chromium oxide 16 is a stand-alone coating that does not rely primarily on diffusion and chemical interaction with the substrate for formation. Thus, the application of this aluminum-chromium oxide layer 16 decouples the need to design superalloy or bond coat compositions to balance (or compromise) both surface reaction functionality and mechanical properties. The following examples may refer to the layer of aluminum-chromium oxide 16, although it is to be understood that the examples can alternatively have additional layers of the aluminum-chromium oxide.

In the example of FIG. 1A, the component 10 is formed of a metal that serves as a metal substrate 18 ("substrate 18"). In this example, the layer of aluminum-chromium oxide 16 is disposed directly on the substrate 18 in the internal passage 12. In alternative examples, the layer of aluminum-chromium oxide 16 is disposed on an exterior surface of the component 10, or disposed on the exterior and interior.

Figure 2:
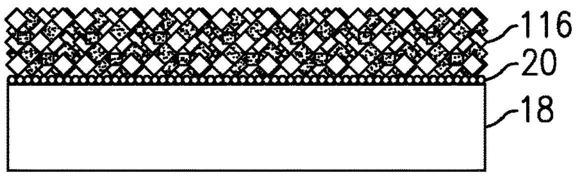
FIG. 2 illustrates an example of a component that has a layer of aluminum-chromium oxide on a metal substrate.

The layer of aluminum-chromium oxide 16 can be implemented alone or in various configurations with other coating layers to enhance performance of the component 10. FIGS. 2-6 illustrate several non-limiting configurations. In this disclosure, like reference numerals designate like elements where appropriate and reference numerals with the addition of one-hundred or multiples thereof designate modified elements that are understood to incorporate the same features and benefits of the corresponding elements. In FIG. 2, the layer of aluminum-chromium oxide 116 is disposed on the substrate 18, with a thin self-passivation oxide scale 20 in between. In one example, the layer of aluminum-chromium oxide 116 is a uniform mix of aluminum oxide and chromium oxide such that the layer of aluminum-chromium oxide 116 is homogeneous. The term "homogeneous" refers to the layer of aluminum-chromium oxide 116 having a uniform composition throughout, such as by a repeating chemical structure or a solid solution.

In another example, the aluminum-chromium oxide 116 has a composition of $Al_{(2-x)}Cr_xO_3$, wherein x is from 0.6 to 1.4. In a further example, x is from 1.0 to 1.2 to provide a more balanced dual benefit of both aluminum oxide and chromium oxide.

Figure 3:
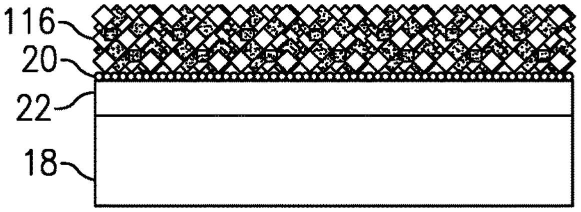
FIG. 3 illustrates another example component that additionally has a bond coat.

In FIG. 3, there is additionally an overlay bond coat 22 disposed between the layer of aluminum-chromium oxide 116 and the substrate 18. For example, the bond coat 22 is MCrAlY, where M is cobalt, nickel, or a mixture thereof. Alternatively, a diffusion aluminide or chromide coating may be applied between the layer of aluminum-chromium oxide 116 and the substrate 18. The morphology, composition, and integrity of the applied aluminum-chromium oxide layer 116 can be tailored to act as an oxygen diffusion barrier and to suppress the formation of a thermally grown oxide (TGO) layer from the bond coat or diffusion coating during service. Thus, the applied layer can be used in place of the TGO to increase bonding with any applied coatings, but at the same time can prevent runaway thermal oxidation, spallation, and depletion of the underlying bond coat 22.

Figure 4:
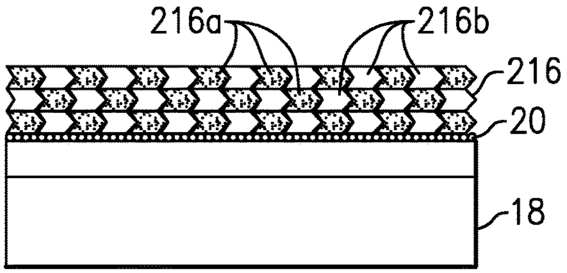
FIG. 4 illustrates another example component that has a composite layer.

In FIG. 4, rather than the homogeneous structure, the layer of aluminum-chromium oxide 216 has a composite nano-structure. For example, the layer of aluminum-chromium oxide 216 has discrete grains or domains of aluminum oxide 216*a* and chromium oxide 216*b*. In this example, the grains of aluminum oxide 216*a* and chromium oxide 216*b* are uniformly dispersed in the layer of aluminum-chromium oxide 216. The grains of aluminum oxide 216*a* and chromium oxide 216*b* have a size of 100 nanometers or less. In one further example, the grains of aluminum oxide 216*a* have the formula of $Al_2O_3$ (alumina) and the grains of chromium oxide 216*b* have the formula $Cr_2O_3$ (chromia). For instance, the alumina is $\alpha$-$Al_2O_3$ and the chromia is $\alpha$-$Cr_2O_3$.

Figure 5:
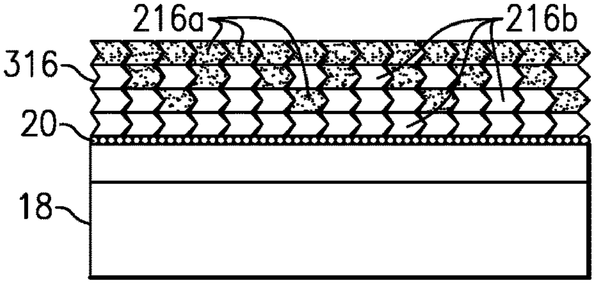
FIG. 5 illustrates another example component that has a graded composition.

In FIG. 5, the layer of aluminum-chromium oxide 316 has a graded composition. For instance, FIG. 5 shows that the region of the layer of aluminum-chromium oxide 216 on the side of the substrate 18 has a greater concentration of the grains of chromium oxide 216*b*. Alternatively, the region of the layer of aluminum-chromium oxide 216 on the side of the substrate 18 can have a greater concentration of the grains of aluminum oxide 216*a*. Thus, for example, the layer of aluminum-chromium oxide 316 can be tailored for better hot corrosion on the side away from the substrate 18 (with higher concentration of chromium oxide) and better high temperature oxidation resistance on the side toward the substrate 18 (with a higher concentration of aluminum oxide).

Figure 6:
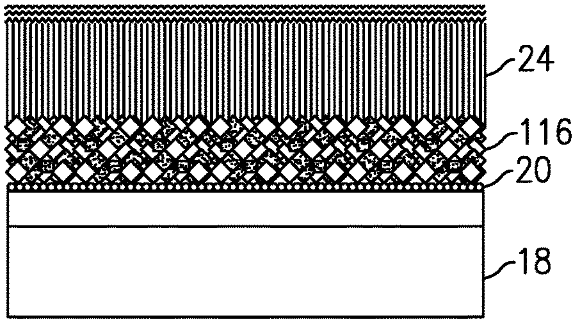
FIG. 6 illustrates another example component that additionally has a ceramic topcoat.

In FIG. 6, there is additionally a ceramic thermal barrier topcoat 24 disposed on the layer of aluminum-chromium oxide 116. For example, the topcoat 24 is an yttria-stabilized zirconia coating, gadolinia-stabilized zirconia coating, or a mixture or combination thereof.

Figure 7:
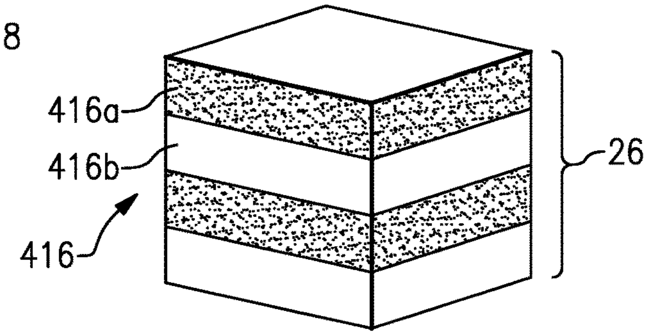
FIG. 7 illustrates an example lamellar structure.

FIG. 7 is a representative portion of another layer of aluminum-chromium oxide 416. In this example, the layer of aluminum-chromium oxide 416 has a lamellar structure 26 in which there are alternating nanolayers of aluminum oxide 416*a* and chromium oxide 416*b*. That is, each nanolayer 416*a*/416*b* has a thickness of 100 nanometers or less. As will be appreciated, in the prior examples, the layers of aluminum-chromium oxide 116/216/316/416 can be substituted for one another, or multiple layers of aluminum-chromium oxide 116/216/316/416 can be used.

Figure 8:
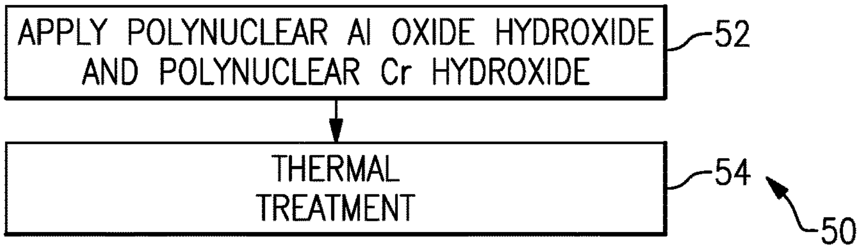
FIG. 8 illustrates an example method of fabricating one or more layers of aluminum-chromium oxide.

FIG. 8 illustrates an example method 50 of fabricating one or more layers of aluminum-chromium oxide, as described above. The method 50 includes at step 52 applying one or more films of polynuclear chromium hydroxide and polynuclear aluminum oxide hydroxide to a metal substrate. At step 54 the method 50 includes thermally treating the metal substrate with the one or more films at a temperature of at least 250° C. The thermal treatment reduces the polynuclear chromium hydroxide and the polynuclear aluminum oxide hydroxide to at least one layer of aluminum-chromium oxide, such as the layers of aluminum-chromium oxide 116/216/316/416. For example, the polynuclear aluminum oxide hydroxide has the formula $[AlO_4Al_{12}(OH)_{24}(H_2O)_{12}]^{7+}$ and the polynuclear chromium hydroxide has the formula of one or more of ($[Cr_2(OH)_2]^{4+}$), ($[Cr_3(OH)_4]^{5+}$), and ($[Cr_4(OH)_6]^{6+}$). The following examples further illustrate aspects of the method 50.

Synthesis of Polynuclear $Al_{13}$

A solution or dispersion of polynuclear aluminum oxide hydroxide may be synthesized. The solution or dispersion may contain metastable polynuclear Al(III) $[Al^{3+}]$ oxide hydroxide precursors. These polynuclear clusters, also called "$Al_{13}$ Keggin clusters" or "$Al_{13}$ clusters," have the formula $[AlO_4Al_{12}(OH)_{24}(H_2O)_{12}]^{7+}$, and are less than 1.5 nanometers in diameter. Synthesized solutions most typically will have concentrations from 0.007 to 0.07 moles $[AlO_4Al_{12}(OH)_{24}(H_2O)_{12}]^{7+}$/liter.

The $Al_{13}$ cluster synthesis starts with an aqueous solution having an Al(III) concentration of about 0.02 to 2.0 moles/liter. The Al(III) solution is prepared by dissolving Al(III) salt precursors, including: $Al(NO_3)_3$ (Al nitrate), $AlCl_3$ (Al chloride), $Al(CH_3CO_2)_3$ (Al triacetate), or $Al[OCH(CH_3)C_2H_5]_3$ (Al tri-sec-butoxide), in water at room temperature.

These $Al_{13}$ clusters are synthesized via controlled neutralization or hydrolysis of the Al(III) solution, by titrating with a base solution at elevated temperatures (e.g., 70° C.), to achieve a mole ratio ($OH^-$/Al(III)) of 2.1-2.6, preferably in the range of 2.2-2.4, resulting in a pH of 4-7. The base solutions for titration can include: NaOH, KOH, ammonium hydroxide, $NaHCO_3$ (sodium bicarbonate), or $Na_2CO_3$ (sodium carbonate).

Alternatively, the $Al_{13}$ clusters can be synthesized by electrolytic neutralization or electroless reduction of an Al(III) solution.

In another alternative, the $Al_{13}$ clusters can be prepared by aqueous electrolysis using sacrificial Al anodes in a mildly acidic or neutral solution, following a similar method to Al electro-coagulation technologies employed for water purification.

The as-synthesized $Al_{13}$ solution contains $Al_{13}$ clusters that are coordinated to multiple counter-anions originating from the Al salt precursor, in order to form a charge-neutralized "$Al_{13}$ complex" or "$Al_{13}$ Keggin complex." For example, the $Al_{13}$ Keggin complex formed from neutralization of $Al(NO_3)_3$ will have the formula $\{[AlO_4Al_{12}(OH)_{24}$ $(H_2O)_{12}]^{7+}*7NO_3^-\}$. If other Al salts are used as precursors, the counter-ions in the $Al_{13}$ Keggin complex will be formed from the salt anions, e.g., $\{[AlO_4Al_{12}(OH)_{24}(H_2O)_{12}]^{7+}*7Cl^-\}$ will be formed from $AlCl_3$ neutralization, etc.

Synthesis of Polynuclear Cr(III) Clusters $Al_{13}$ and $Fe_{13}$ clusters have similar structures, and such clusters have been shown to be precursors ("pre-polymers") for forming their respective metal hydroxide and oxide solid-state phases. They can be considered to act as nuclei that are related in structure to intermediate hydroxide and oxide phases. Since Cr, Al, and Fe all form isomorphic, hexagonal sesquioxide phases (those having a $M_2O_3$ stoichiometry with M=metal, i.e., $Cr_2O_3$ eskolaite, $Al_2O_3$ corundum, and $Fe_2O_3$ hematite), Cr(III) ions may form a similar precursor clusters.

Cr(III) ions are known to form various polynuclear structures. For example, the hydrolysis of Cr(III) in a slightly acidic aqueous solution results in the formation of monomeric, dimeric ($[Cr_2(OH)_2]^{4+}$), trimeric ($[Cr_3(OH)_4]^{5+}$), and tetrameric ($[Cr_4(OH)_6]^{6+}$) species. These clusters will complex with charge-neutralizing counter-ions, that originate as the anions in the Cr(III) salt that was used to prepare the polynuclear clusters. These species are formed in weak acids (up to pH=4). Condensation (olation or oxolation) reactions can occur between hydroxyl groups at higher pH values, resulting in the formation of Cr polymer chains connected by bridging hydroxyl or oxygen groups. Molecules with functional groups such as carboxylates, like acetates, may act as bridging ligands. In this manner, three-dimensional Cr(III) hydroxide acetate clusters can form, e.g., such as those incorporating 6, 8, and 12 Cr(III) ions. The cluster plus charges depend on the coordination and linkage with negatively-charged bridging ligands. These clusters are complexed with negative counter-ions in order to neutralize the cluster charge. Some examples of Cr clusters include chromium(III) hydroxide carboxylates and cyclic and cubane type hexachromium hydroxide acetates.

Polynuclear clusters containing Al(III) and Cr(III) can be prepared as separate solutions or mixed together, depending on the desired characteristics of the final coating, i.e., the chromia and alumina local degree of mixing (at the atomic, nano, or sub-micron scales) and compositional uniformity or gradation across the coating thickness. For example, the co-hydrolysis of Al(III) and Cr(III) salt precursors will form a mixture of their respective pure polynuclear clusters. A single liquid coating formulation containing both polynuclear clusters of Al(III) and Cr(III) will result in an intimately mixed aluminum-chromium oxide solid solution or nanocrystals, depending on the deposition and heat treatment conditions (e.g., a layer of aluminum-chromium oxide 116). Alternatively, the polynuclear clusters containing Al(III) and Cr(III) may be prepared separately, and mechanically mixed together, where high energy ball-milling may result in their partial transformation and nucleation of solid-state phase structures.

Liquid Coating Formulation

After synthesis, the polynuclear clusters can be collected by concentration (drying), precipitation, or coagulation. They can be purified by filtration, washing, ion exchange, or dialysis. They can be reconstituted or re-suspended in an acidic (pH>4) or basic (pH=8.5-9.5) aqueous solution, a high pH (>9) sol, or an organic or inorganic solvent dispersion. In addition to water, solvents and dispersion media can include methanol, ethanol, isopropanol, butanol, acetic acid, formic acid, dimethylformamide, ethyl acetate, and tetrahydrofuran. The polynuclear clusters are positively charged over a large pH range, where their complex charges may decrease with increasing pH due to hydrolysis reactions.

The polynuclear cluster counter-anions can be exchanged with anionic ligands, such as $F^-$ and carboxylate ions, which bind to the outer coordination sphere of the polynuclear complex. The complex outer coordination sphere waters can be also exchanged with alcohols or esters that can associate with the complex.

The polynuclear Al(III) and/or Cr(III) cluster solution or dispersion formulae can include additives such as surfactants or amphiphilic ligands, organic or polymer binders, buffer species, viscosity modifiers, co-coagulants, corrosion-inhibitors, or chelating agents. These additives serve to accelerate deposition and adhesion to the substrate surface layer.

Dopants, such as metals, can be combined with the polynuclear Al(III) or Cr(III) liquid precursor coating formulations, where the dopant concentration may range up to 5 wt % of the total metal content. For instance, the one or more layers of aluminum-chromium oxide contain a dopant metal in an amount, relative to the total weight of all metals in the one or more layers of aluminum-chromium, of 0.1 wt % to 5 wt %.

For example, the dopant metal includes at least one of titanium, zirconium, hafnium, tantalum, manganese, tungsten, iron, copper, nickel, and combinations thereof. In a further example, the dopant metal includes at least one of iron, manganese, copper, and combinations thereof. In one example, the dopant metal is or includes titanium. In an additional example, the dopant metal includes at least one of cerium, dysprosium, erbium, gadolinium, lanthanum, lutetium, neodymium, praseodymium, scandium, thulium, ytterbium, yttrium, and combinations thereof. In one further example, the dopant metal includes a first dopant metal of titanium, zirconium, hafnium, tantalum, manganese, tungsten, iron, copper, nickel, and combinations thereof and a second dopant metal of cerium, dysprosium, erbium, gadolinium, lanthanum, lutetium, neodymium, praseodymium, scandium, thulium, ytterbium, yttrium, and combinations thereof.

The dopants may modify the precipitate crystalline ordering, enhance phase transformation kinetics of the consolidating coating, and/or act as nucleation agents for crystallization. For example, intermediate size dopants, like iron, manganese, or copper may accelerate and reduce the temperature for oxide formation. Other dopants, such as titanium, may function as grain refiners and prevent particle growth. Maintaining a small grain size could be important for maintaining local aluminum-chromium oxide uniformity over large temperature cycles. Additional dopants may be used to improve oxide adherence and integrity of the oxide coating-metal substrate interface.

Coating Application

Degreasing or alkaline cleaning pretreatment of the substrate may be required depending on processing history. Alternatively, native oxides or smut can be removed by initial cathodic treatment in acidic or alkaline aqueous solution.

The polynuclear formulation(s) containing Al(III) and/or Cr(III) can be applied by known solution-based coating methods, including dipping or soaking, painting, spraying, spin-coating, flow-through internal passages and surface, or (pulse) electrophoresis, where the positively-charged polynuclear clusters are deposited on the negatively-charged aluminum alloy substrate (cathode). The addition of a surfactant is another way to promote wetting of the surface layer. An electrical bias may be applied on the component substrates to facilitate infiltration or deposition of the polynuclear clusters using an electrophoretic driving force. This may be used for the uniform coating of non-line-of-sight surfaces and complex geometry surfaces.

Figure 9:
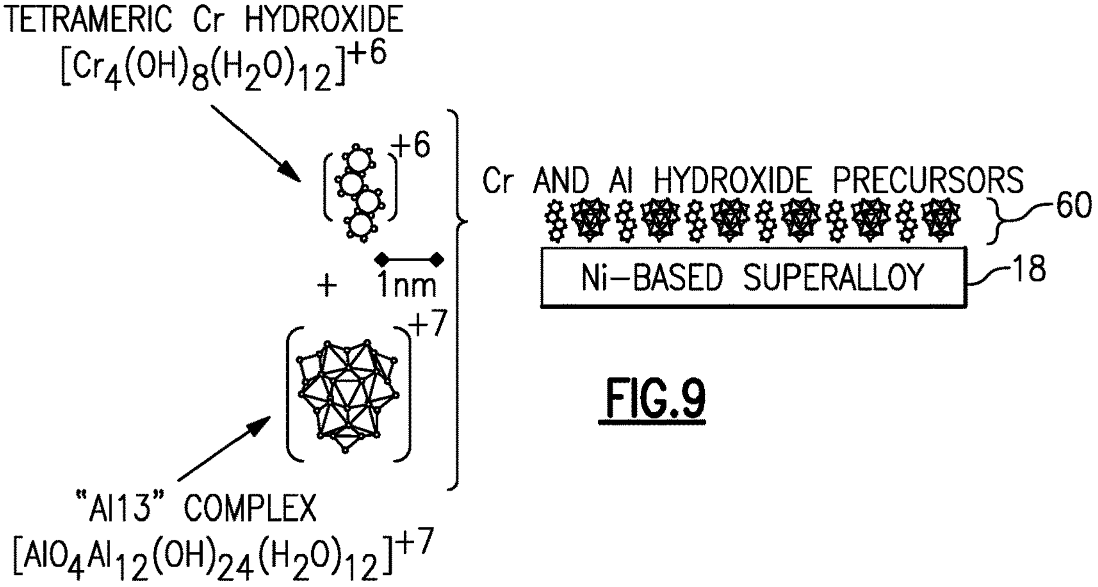
FIG. 9 illustrates the formation of a film of polynuclear aluminum oxide hydroxide and polynuclear chromium hydroxide on a substrate during the fabrication process.

The solution(s) may be applied to components in a single layer or in several successive layers, to build up to a targeted coating thickness. If more than one liquid coating feed is used, they can be applied separately by any coating method, one before the other, or jointly, using any combination of application methods. FIG. 9 schematically illustrates application of a solution on the substrate 18 to form a film 60 of the polynuclear chromium hydroxide and polynuclear aluminum oxide hydroxide.

The oxide phases present in the coating depend on the heat treatment conditions used. Ramp-up over temperatures of about 100 to about 500° C. will cause any remaining water, ligands, and non-metallic counter-ions or additives present in the coating to desorb or to decompose. During drying the polynuclear clusters first condense to form Al(III) or Cr(III) trihydroxide phases. The heat treatments convert the film 60 of amorphous aluminum trihydroxide layers into alumina; progressing to aluminum oxide hydroxide (pseudo-boehmite or boehmite) above 212° F./100° C., transition aluminas above 570° F./300° C. (progressing from $\gamma$-$Al_2O_3$ to $\delta$-$Al_2O_3$ and then to $\theta$-$Al_2O_3$ with increasing temperature), and $\alpha$-alumina (corundum) above 1832° F./1000° C. Heat treatments also facilitate diffusion bonding and adhesion of the aluminum-chromium oxide layer with the substrate.

During thermal treatment, the chromia trihydroxides dehydrate and convert into the hexagonal chromia (eskolaite) at around 600° C. In mixed phases, chromia will form first and act as a template for $\alpha$-$Al_2O_3$ formation as low as 280° C. Depending on the grain size, high temperature heat treatment conditions (above 1000° C.) may be required to fully homogenize the aluminum-chromium oxide solid solution at the atomic level. Thermal treatment in vacuum or noble gas atmospheres may be used to accelerate phase transformations and densification.

Phase transformation for nanocrystalline materials may be likely to occur at lower temperatures, because of the increased contribution of the surface energy component. For example, the phase transformation and melting temperatures of nanocrystalline materials smaller than 50 nanometers in diameter, decrease dramatically with decreasing grain size.

Coating Characteristics

An aluminum-chromium oxide coating provides protection for operation of a metal component in corrosive and oxidative conditions over a wide temperature range. A mixed sesquioxide phase preferred, as it is dense, corrosion-resistant, and refractory. However, a mixture of $Cr_2O_3$ with metastable amorphous or transition $Al_2O_3$ phases, where partial Cr substitution may occur on the latter, may provide good corrosion-protection, if it is not possible to incorporate the Al into a fully-dense mixed hexagonal phase. This is because the coating thermal treatment conditions may be limited to preserve the substrate alloy temper and thermal history. Laser or cathodic micro-arc treatments may be used to locally consolidate the oxide coating without substantially heating the substrate.

Chromia provides corrosion-resistance to sulfate species and oxidation resistance at intermediate temperatures (~700-1000° C.). Alumina provides protection against high temperature oxidation above 1000° C., and provides a stable matrix that suppresses chromium diffusivity and volatility. Aluminum-based sesquioxide phases have stability against Al evaporation and sintering.

The total coating thickness may range from 0.005 to 5 microns. The thickness depends on the concentration of polynuclear clusters in the liquid coating formation(s), the coating application method(s), the number of applications, and the post treatment conditions. The upper limit for the coating thickness is that which has been observed to tolerate elastic strain energy due to thermal mismatch, without failing by spalling.

In true bulk solutions, chromia-alumina has a miscibility gap upon cooling that has a critical point at about 30.5 mol % $Cr_2O_3$ and 1271° C. The temperature of this gap varies with grain size. Nanoscale grains and dopants can lower the temperature and breadth of this miscibility gap. Dopants may also be used to retard or accelerate phase separation. Below this gap, spinodal decomposition may result in the formation of Al-rich $\alpha 1$ (~8 mol % $Cr_2O_3$) and Cr-rich $\alpha 2$ (~58 mol % $Cr_2O_3$) phases. However, since atomic diffusion is slow, spinoidal decomposition may take weeks and may not be fully substantiated in thermal cycling of the deployed metal component.

Spinoidal decomposition within the miscibility gap is spontaneous and occurs by local segregation in the hexagonal phase (001) direction, resulting in a nanoscale (<10 nm thick) lamellar distribution of Cr-rich and Al-rich phases without a significant change in structure. A laminated phase structure may be good for providing corrosion-protection against sulfate species at lower temperatures, while stabilizing the coating composition. This phase separation results in a volume contraction, which may be beneficial for compensating for the thermal mismatch between the metal alloy substrate with a larger coefficient of thermal expansion and the protective oxide overlayers having much lower coefficients of thermal expansion. This contraction during phase separation upon cooling could constitute a strain energy release mechanism that may prevent coating cracking and spalling. Alternatively, the coating can contain a mixture of alumina and chromia grains that are locally segregated at the atomic or nano-scale, but homogeneous in composition at higher length scales.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:

a metal substrate; and a coating system disposed on the metal substrate, the coating system containing at least one layer of aluminum-chromium oxide, the at least one layer including a discrete domain of aluminum oxide and a discrete domain of chromium oxide such that the composition of the layer varies laterally, wherein the discrete domain of aluminum oxide and the discrete domain of chromium oxide have a lamellar structure extending in a direction parallel to a surface of the metal substrate, wherein the discrete domain of aluminum oxide and the discrete domain of chromium oxide are grains of aluminum oxide and chromium oxide, respectively, and the grains have an average grain size of 100 nanometers or less.

2. The component as recited in claim 1, wherein the aluminum oxide includes $Al_2O_3$ and the chromium oxide includes $Cr_2O_3$.

3. The component as recited in claim 1, wherein aluminum oxide includes $\alpha$-$Al_2O_3$ and the chromium oxide includes $\alpha$-$Cr_2O_3$.

4. The component as recited in claim 1, wherein the metal substrate has an internal passage and the layer of aluminum-chromium oxide is disposed on the internal passage.

5. The component as recited in claim 1, further comprising a bond coat or a diffusion coating disposed between the layer of aluminum-chromium oxide and the substrate.

6. The component as recited in claim 5, further comprising a ceramic thermal barrier topcoat disposed on the layer of aluminum-chromium oxide.

7. The gas turbine engine component of claim 5, wherein the bond coat is MCrAlY, wherein M is cobalt, nickel, or a mixture thereof.

8. The gas turbine engine component of claim 5, wherein the diffusion coating is aluminide or chromide.

9. The component as recited in claim 1, wherein the layer of aluminum-chromium oxide contains a dopant metal, and the dopant metal is present in an amount, relative to the total weight of all metals in the one or more layers of aluminum-chromium, of 0.1 wt % to 5 wt %.

10. The gas turbine engine component of claim 1, wherein the at least one layer of aluminum-chromium oxide has a graded composition.

11. The gas turbine engine component as recited in claim 1, wherein the lamellar structure includes alternating nanolayers of the discrete domain of aluminum oxide and discrete domain of chromium oxide.

* * * * *